(12) United States Patent  
Greenberg

(10) Patent No.: US 6,718,911 B2  
(45) Date of Patent: Apr. 13, 2004

(54) PORTABLE FLUID DISPENSER FOR ANIMALS

(75) Inventor: H. Stanley Greenberg, Rancho Santa Margarita, CA (US)

(73) Assignee: G4 Ventures, Inc., Rancho Santa Margaritta, CA (US)

( * ) Notice: Subject to any disclaimer, the term of this patent is extended or adjusted under 35 U.S.C. 154(b) by 87 days.

(21) Appl. No.: 09/936,147

(22) PCT Filed: Dec. 12, 2000

(86) PCT No.: PCT/US00/33595  
§ 371 (c)(1),  
(2), (4) Date: Mar. 13, 2002

(87) PCT Pub. No.: WO01/43536  
PCT Pub. Date: Jun. 21, 2001

(65) Prior Publication Data  
US 2003/0094139 A1 May 22, 2003

Related U.S. Application Data

(60) Provisional application No. 60/170,542, filed on Dec. 14, 1999, and provisional application No. 60/174,701, filed on Jan. 6, 2000.

(51) Int. Cl.[7] .......................... A01K 1/10; A01K 39/00; A01K 5/00  
(52) U.S. Cl. ........................................ 119/51.5; 119/72  
(58) Field of Search ................ 119/51.5, 52.1, 119/53, 72, 75, 81; 224/660, 665, 677

(56) References Cited

U.S. PATENT DOCUMENTS

| 3,720,184 | A |  | 3/1973 | Pearce |
| 4,034,715 | A |  | 7/1977 | Arner |
| 4,192,256 | A |  | 3/1980 | Clugston |
| 4,281,624 | A |  | 8/1981 | Raines |
| 4,315,483 | A |  | 2/1982 | Scheidler |
| 4,350,274 | A |  | 9/1982 | Morgan |
| 4,721,063 | A |  | 1/1988 | Atchley |
| 4,762,087 | A |  | 8/1988 | Henecke |
| 4,899,693 | A |  | 2/1990 | Arnold |
| 4,947,796 | A |  | 8/1990 | Robinette |
| 5,105,768 | A |  | 4/1992 | Johnson |
| 5,259,336 | A |  | 11/1993 | Clark |
| 5,488,927 | A |  | 2/1996 | Lorenzana et al. |
| 5,636,592 | A |  | 6/1997 | Wechsler |
| 5,722,574 | A | * | 3/1998 | Pratt .......................... 224/660 |
| 5,738,039 | A |  | 4/1998 | Berman et al. |
| 5,809,934 | A |  | 9/1998 | Gavet |
| 5,809,935 | A |  | 9/1998 | Kolterman et al. |
| 5,823,136 | A | * | 10/1998 | Zarski ........................ 119/51.5 |
| 5,960,742 | A |  | 10/1999 | O'Rourke et al. ............ 119/74 |
| 5,992,702 | A |  | 11/1999 | Shapiro |
| 6,101,974 | A |  | 8/2000 | Frohlich ..................... 119/51.5 |
| 6,293,226 | B1 | * | 9/2001 | Hwang ....................... 119/72 |
| 6,293,445 | B1 | * | 9/2001 | Miller ........................ 224/665 |
| 6,374,773 | B1 | * | 4/2002 | McIntyre et al. ............. 119/72 |

* cited by examiner

*Primary Examiner*—Charles T. Jordan  
*Assistant Examiner*—Elizabeth Shaw  
(74) *Attorney, Agent, or Firm*—Don J. Carnegie

(57) ABSTRACT

A portable animal fluid dispenser (10) including a reservoir (12) and a container (14) detachably mounted to a side wall (22A) of the reservoir (12). The container (14) has an outlet in fluid communication with a passage (24) in the side wall (22A) and a closure (34) removably coupled to the passage (24). A carrier (16) is provided to attach the carrier (16) to an article worn by a person, for example a belt.

28 Claims, 5 Drawing Sheets

PORTABLE FLUID DISPENSER FOR ANIMALS

This application claims benefit of provisional application Serial No. 60/170,542 filed Dec. 14, 1999 and Ser. No. 60/174,701 filed Jan. 6, 2000.

BACKGROUND AND SUMMARY OF THE INVENTION

The present invention relates to a portable animal fluid dispenser.

It is often desirable to water an animal during a long walk. This is especially true when the weather is very warm. Water supply is not always available. This has created a need for a portable water dispenser. Typical examples are shown in U.S. Pat. Nos. 3,720,184; 5,105,768; 5,636,592; 5,738,039; 5,809,934 and 5,809,935. These styles generally include a handle for carrying. They also require some manipulation in setting up or using the device. Some of the structures are not necessarily stable for use by the animal without aid of the owner.

The present invention provides a portable animal fluid dispenser which is hands-free. It includes a reservoir having bottom and side walls and a container detachably mounted to a first side wall of the reservoir. The container has an outlet in fluid communication with a passage in the side wall and a closure removably coupled to the passage. A carrier is provided and shaped to attach the carrier to an article worn by a person, for example a belt. The carrier may be integral with the reservoir or separate and have an opening generally the shape of the cross-section of the container for receiving the container. The carrier includes an attachment which may be hook shaped.

Preferably, the passage in the first side wall is adjacent the bottom wall. The side wall includes a threaded receiver structure encompassing the passage and receiving a threaded structure of the container. The container preferably is an open ended container. A tether connects the closure to the reservoir. The tether and closure may be integral to the receiver structure. The closure my be a plug received in the passage. The dispenser has a longitudinal axis parallel to the bottom wall and the length of the container along the longitudinal axis is greater than the length of the reservoir along the longitudinal axis. The dimensions of the container and reservoir are interrelated to assure that the reservoir will not overflow and nearly all the fluid will flow into the reservoir. The reservoir can be square shaped or cylindrical.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
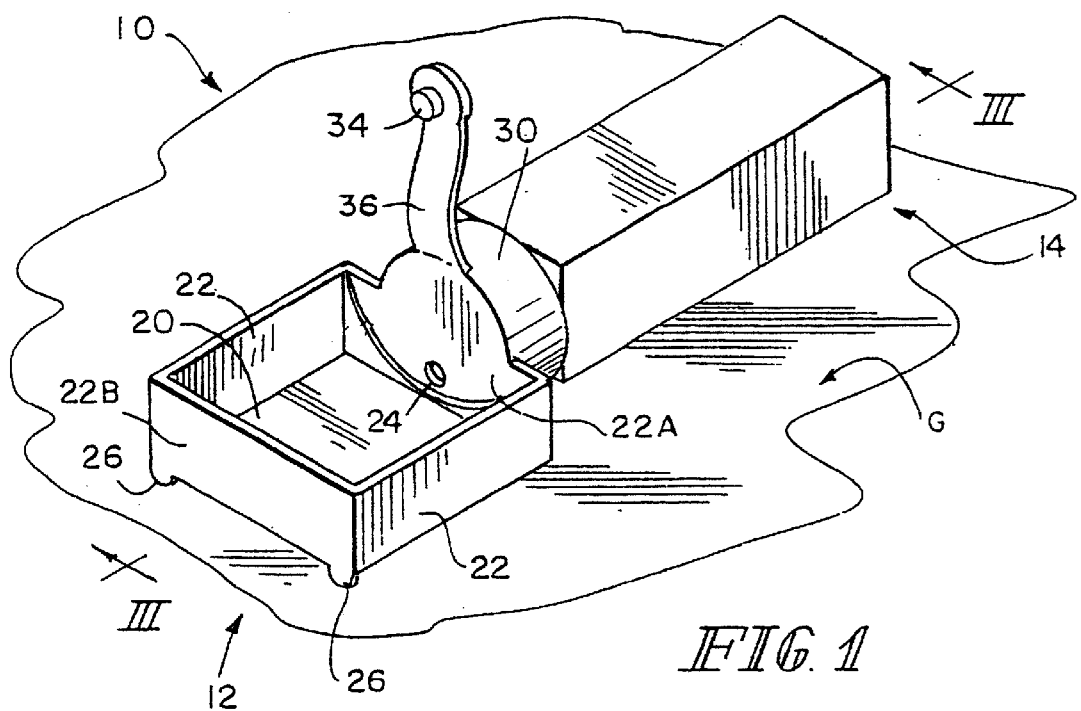
FIG. 1 is a perspective view of a portable animal fluid dispenser in its use position according to the principles of the present invention.
Figure 2:
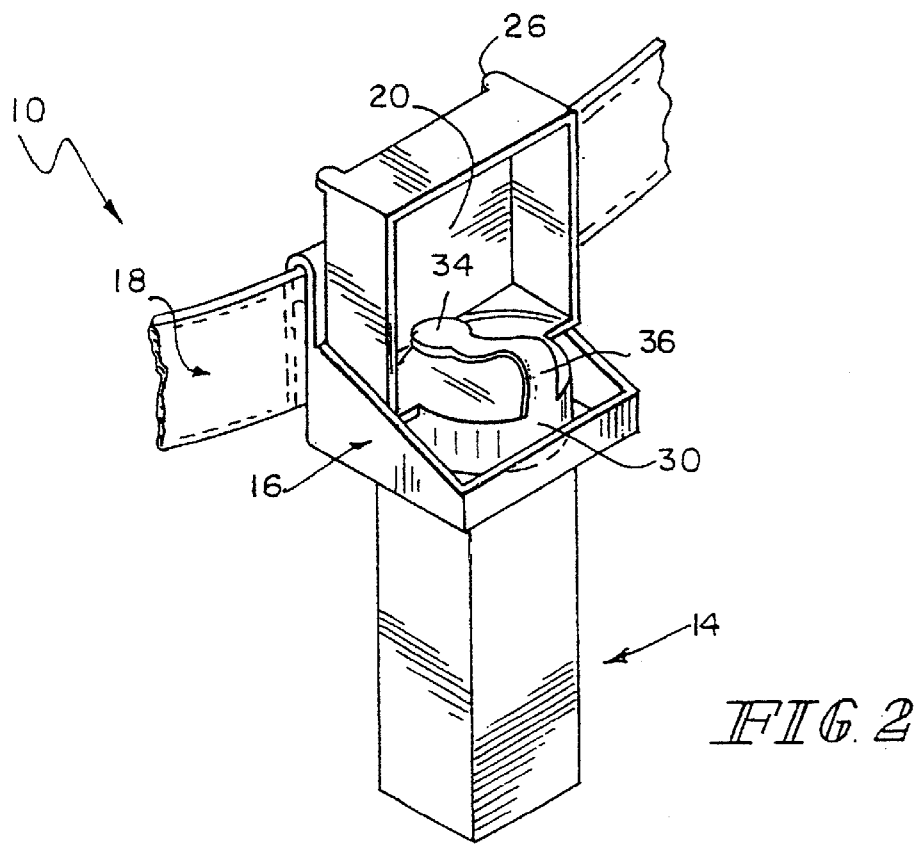
FIG. 2 is a perspective view of the portable animal fluid dispenser of FIG. 1 in its transport position.

A portable animal dispenser 10, as illustrated in FIG. 1, includes a reservoir 12 from which the animal drinks and a storage container 14 detachably mounted to the reservoir 12 by the receiver structure 30. A carrier 16, as shown in FIG. 2, supports the dispenser 10 and attaches it to a belt or waist band 18 of the pet owner. The dispenser 10 is transported as shown in FIG. 2 and then placed on the ground G wherein fluids in container 14 flows into reservoir 12 to be drunk by the animal. Once the animal is done, the fluid can be thrown out or poured back into the container 14 and mounted back onto the belt 18 via the carrier 16 which may remain on the belt 18.

Figure 8:
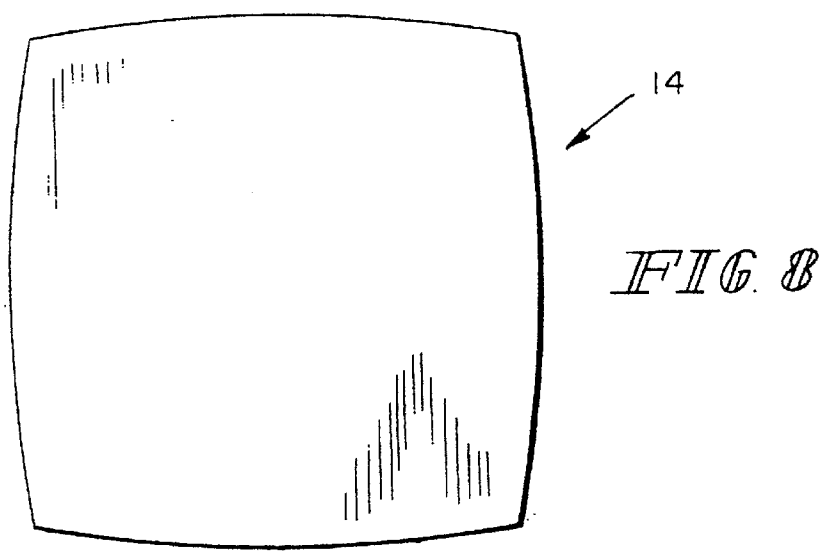
FIG. 8 shows the slight curvature of the sides of the container.

The reservoir 12 includes a bottom 20 and a plurality of side walls 22. A passage 24 in one of the side wall 22A fluidly connects the container 14 to the reservoir 12. A pair of feet 26 adjacent to the bottom of the side wall 22B space the bottom wall 20 from the ground G. The feet 26 together with a single contact point, provided at the other end by the slightly curved sidewalls of the container 14 as shown in FIG. 8, form a three point support which assures stability in the drinking mode shown in FIG. 3.

Figure 3:
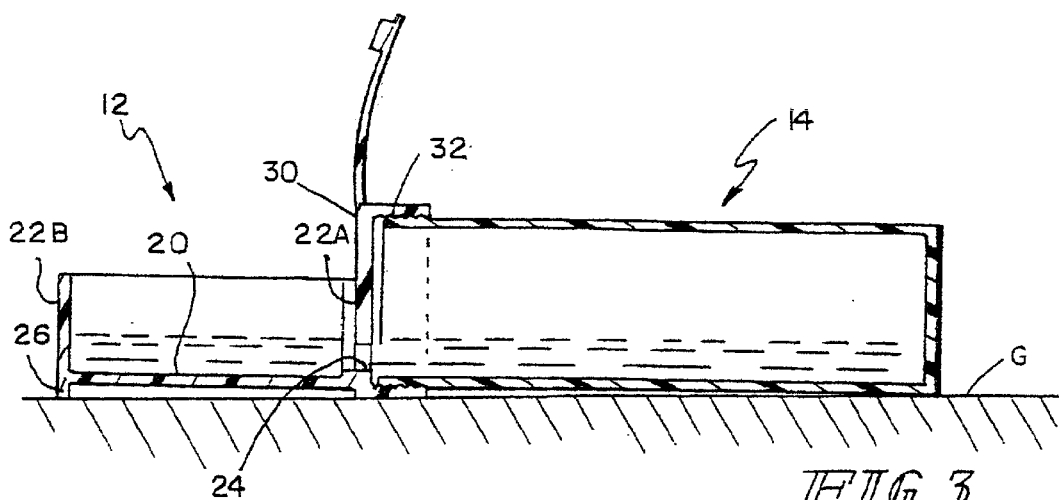
FIG. 3 is a cross sectional view taken along lines III—III of FIG. 1.

As shown in FIGS. 1 and 3, the passage 24 is adjacent to the bottom wall 20. This allows maximum emptying of the container 14 into the reservoir 12. A sculpturing may be provided on the wall 22A to urge the fluids towards the passage 24 when the dispenser 10 is returned to its upright or transport position. This allows collection of any remaining water not consumed by the animal.

As shown in FIG. 3, the wall 22A of the reservoir 12 includes a receiver 30 which threadably receives at 32 a threaded portion of the container 14. The threading is configured to be repeatable in its positioning of the container relative to the reservoir over the life of the dispenser. Sealing of the container 14 to receiver 30 interface is achieved by compression between a seal ridge on the receiver and a protrusion on the inner wall of the container 14. The container 14 preferably is an open mouthed container. If a smaller receiver 30 is desirable, a small mouth container 14 could be used with its mouth adjacent to the side wall which engages the ground in the drinking mode. A closure 34, illustrated as a plug, is connected by tether 36 to the receiver 30 and is received in the passage 24 as illustrated in FIG. 2. A threaded closure 34 may also be used. The tether 36, plug 34, receiver 30 and reservoir 12 may be a single moulded product. Tether 36 may be a strip as shown, a cord, or any other structure and may be formed separate from the receiver 30 and attached thereto.

Also as illustrated in FIG. 3, the rear of the container 14 also rests on the ground G. The container 14 may taper from its threaded open end towards its closed end portion. Alternatively, the interior threaded portion 32 of the receiver 30 may be skewed to allow the container 14 to be inclined from the receiver 30 down towards the ground G.

The particular structure illustrated stabilizes the total portable animal fluid dispenser 10 in its use position of FIGS. 1 and 3. The longitudinal length of the container 14 is larger than the longitudinal length of the reservoir 12, further enhancing the stability.

Figure 7:
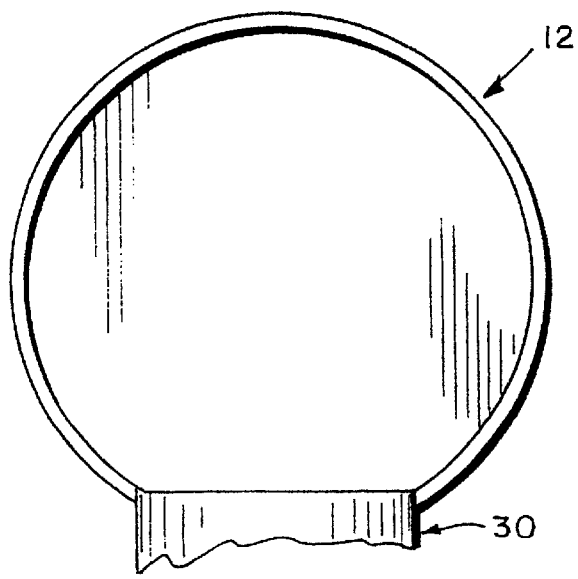
FIG. 7 shows an alternate reservoir shape.
Figure 9:
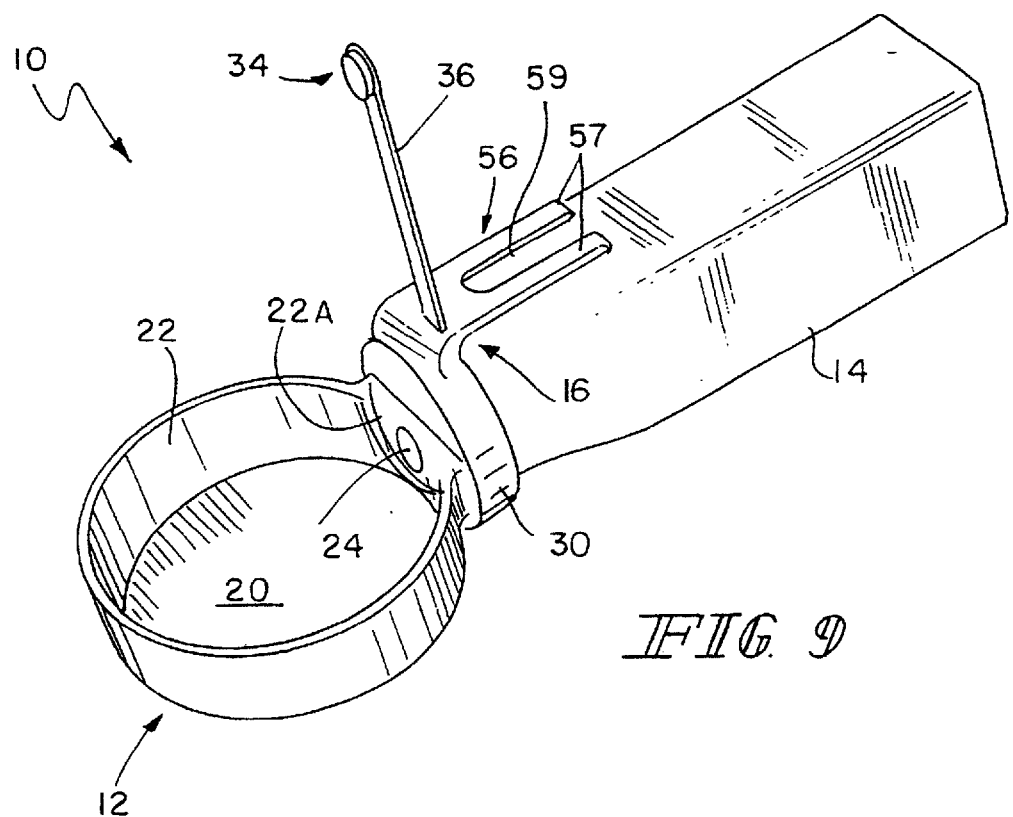
FIG. 9 is a perspective view of another embodiment of the portable animal fluid dispenser according to the principles of the present invention.
Figure 10:
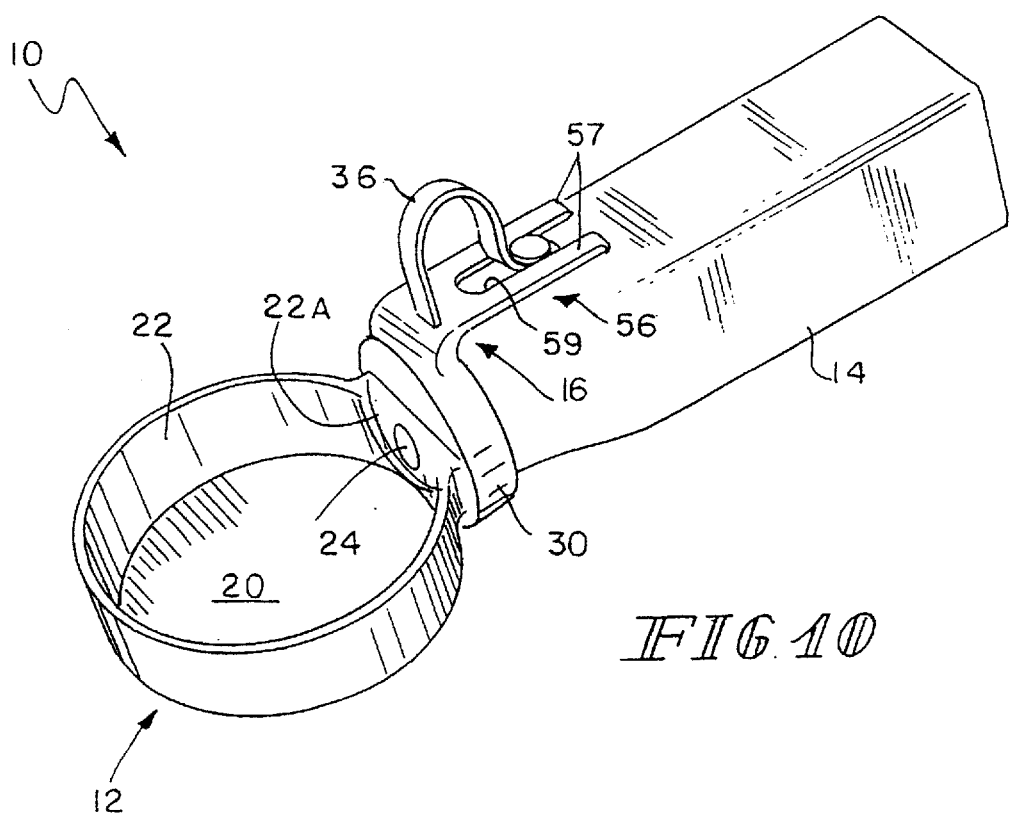
FIG. 10 is a perspective view of the embodiment of FIG. 9, shown with the closure in the channel.

The cross section and length of the container 14 compared to the dimensions of the reservoir 12, are selected such that the water level in the reservoir 12, will not exceed or overflow the reservoir 12 when in a use position. (as shown in FIGS. 1, 9, 10), even when the container 14 is full of fluid. The reservoir 12 may have a square-type configuration, as shown in FIGS. 1 and 2, or may be circular as shown in FIGS. 7, 9 and 10.

The container 14 may have a nearly square cross-section, as shown in FIGS. 2 and 8, or may be cylindrical. If a square-type configuration is used, however, the four sides of the container 14 may be curved (as shown in FIG. 8) in order to maintain.stability of the dispenser in the use position in any angular position.

Figure 4:
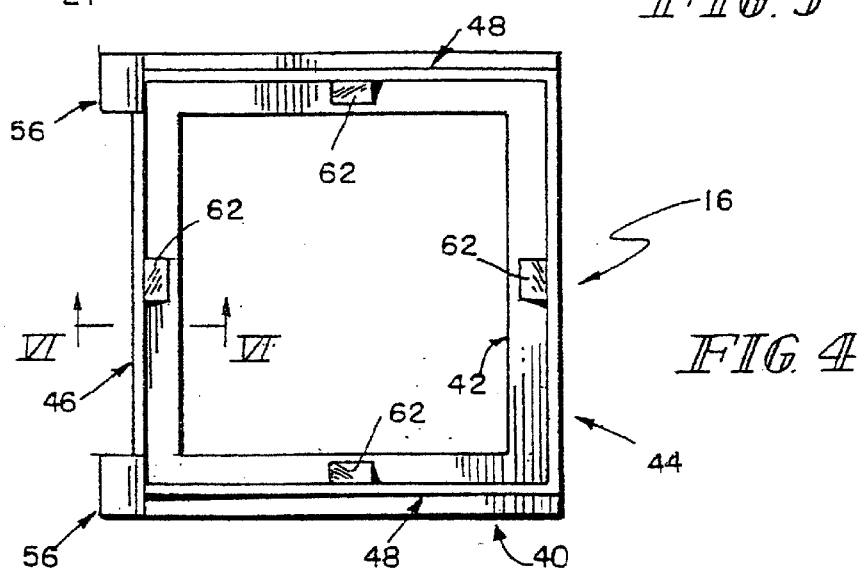
FIG. 4 is a plan view of a carrier according to the principles of the present invention.
Figure 5:
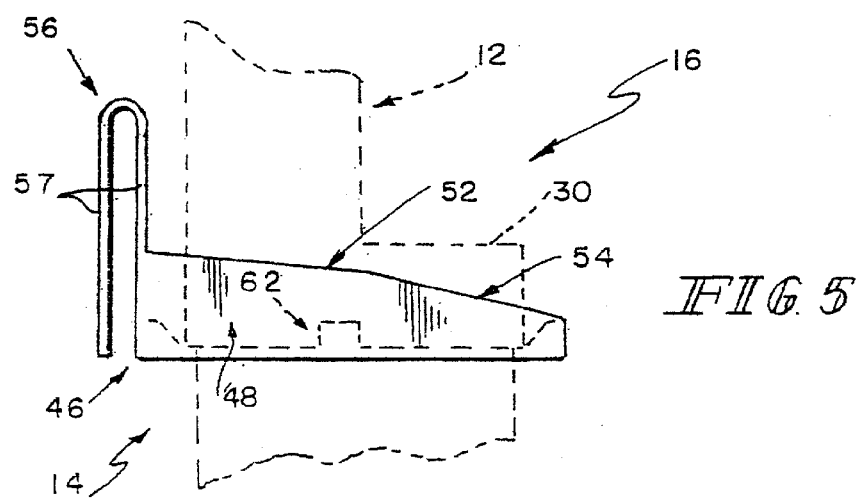
FIG. 5 is a side view of the carrier of FIG. 4.

As shown in FIGS. 4 and 5, the carrier 16 includes a horizontal wall 40 with an opening wall 42 having the general shape of the cross section of container 14. A front wall 44, a rear wall 46, and a pair of side walls 48 each extend from the plate 40. The side walls 48 secure the plate 40 to the rear wall 46. The side walls 48 include two sloping top edges 52 and 54. The reservoir 12 and the receiver 30 are shown in phantom in FIG. 5.

Figure 6:
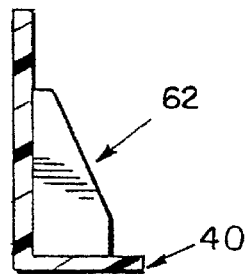
FIG. 6 is a cross sectional view along lines VI—VI of FIG. 4 showing the guides that assist replacement of the dispenser onto the carrier.

An attachment 56 is illustrated as a pair of spaced-apart hooks 57 on the back wall 46 and would receive a belt or waist band 18 as shown on FIG. 2. Preferably, the opening 42 in the carrier is greater than the outside diameter of the container 14 to allow easy insertion and removal. In the transport position in FIG. 2, the receiver 30 rests on the top surface of the plate 40 to support the dispenser 10 in the carrier 16. As shown in FIGS. 4 and 6, the guides 62 assist in the repositioning of the receiver 30 onto the surface of the plate 40 and provide lateral support to the receiver 30 and hence the dispenser 10 during the transportation mode.

FIGS. 9 and 10 show another embodiment of the attachment 56. In this embodiment, the attachment 56 comprises a pair of spaced apart hooks 57 that form a channel 59 therebetween. The closure 34 adjacent the end of the tether 36 slides into the channel 59 in order to retain the closure 34, as shown in FIG. 10. The receiver 30, tether 36, closure 34, and attachment 56 may all be integrally formed.

Figure 11:
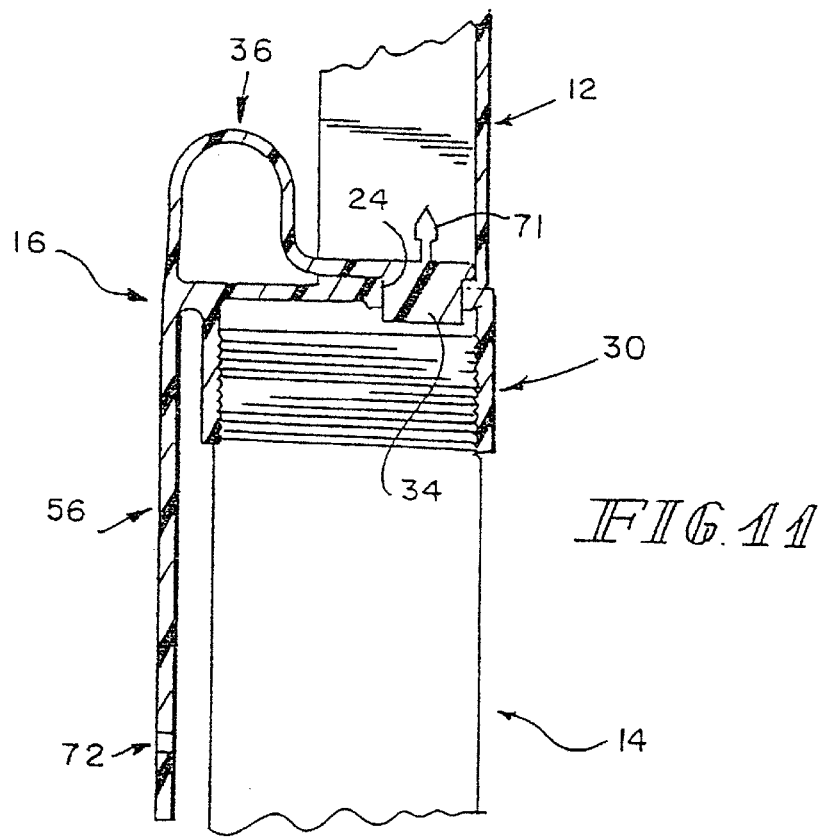
FIG. 11 is a cross-sectional view of the another embodiment of the portable animal fluid dispenser according to the principles of the present, invention.
Figure 12:
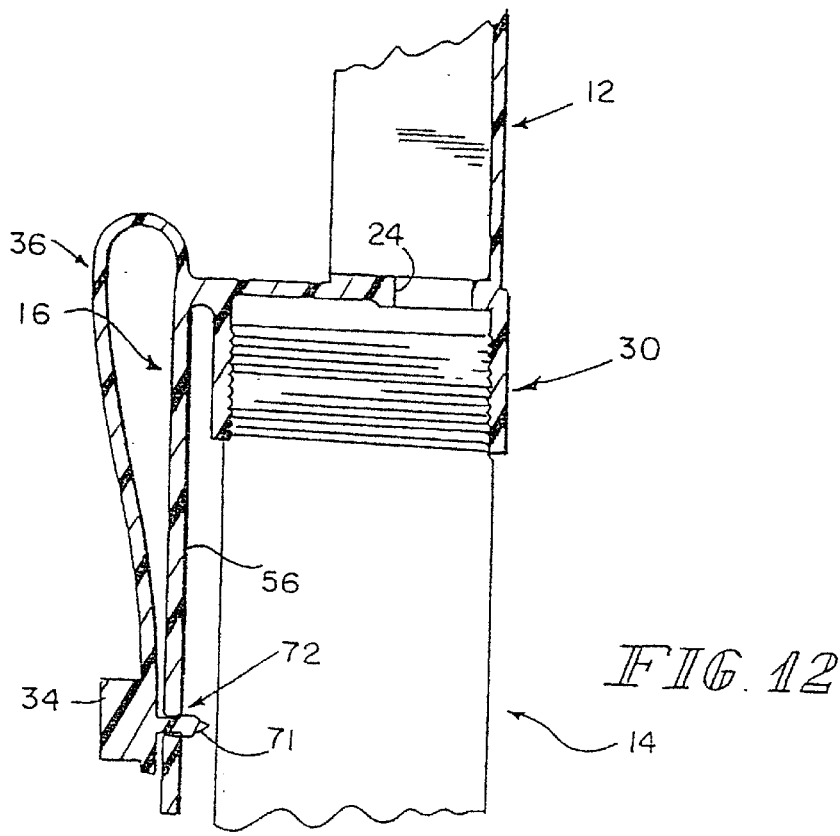
FIG. 12 is a cross-sectional view of the embodiment of the portable animal fluid dispenser of FIG. 11, shown with the closure removed from the passage.

Another embodiment of the portable animal fluid dispenser 10 is illustrated in FIGS. 11 and 12. The carrier 16 is integral with the receiver 30 and the reservoir 12. The tether 36 is also integral with the receiver 30 and the closure 34. All of these integrated structures may be formed by injection molding, for example.

The attachment 56 may extend along the side of the container 14 which is opposite the side adjacent the ground G when in use. In order to retain the closure 34 in a location away from the passage 24 when the dispenser 10 is being used, the attachment 56 has a hole 72 to securely receive a probe 71 adjacent an end of tether 36, as shown in FIG. 12.

The use of the portable animal fluid dispenser 10 includes removing the container 14 from the receiver 30 and filling it with liquid. When the container is full, it is threadably received in the receiver 30. The closure 34 is configured to close the passage 24 in the wall 22A of the reservoir 12. In the embodiments as shown in FIGS. 2, 4, and 5, for example, the container 14 may be into the opening 42 of the carrier 16, which is either on or then placed on a belt or waistband 18 of the owner. To provide liquid for an animal, the owner removes the dispenser 10 from the carrier 16 and places it on the ground G. The closure 34 is removed from the passage 24. In the embodiments as shown in FIGS. 9–12, for example, the carrier 16, attachment 56, and receiver 30 may be integrally formed In any of these embodiments, liquid flows from the container 14 through the passage 24 in order to fill the reservoir. The flow continues until the liquid in the reservoir 12 and the container 14 are the same level. The animal drinks from the reservoir 12 which continues to refill from the container 14. If the animal does not use all of the liquid, the dispenser 10 is raised from its horizontal to a vertical position and the fluid flows back through passage 24 into container 14. The closure 34 is then replaced onto the passage 24 and the container 14 is reinserted on to the carrier 16, as in the case of the embodiments shown in FIGS. 1, 2, and 4, or the in the embodiments shown in FIGS. 9–12, dispenser 10 is replaced onto an article worn by a person.

Depending upon how much liquid is consumed, the animal may be watered again on the same trip. The cycle is then repeated to refill the container 14.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A portable animal fluid dispenser comprising:
   a reservoir having a bottom and side walls;
   a container detachably mounted to a first side wall of the reservoir;
   the container having an outlet in fluid communication with a passage in the first wall;
   a closure removably coupled to the passage; and
   a carrier to attach the container to an article worn by a person.

2. The dispenser according to claim 1, wherein the passage in the first side wall is adjacent the bottom wall.

3. The dispenser according to claim 1, wherein the first side wall includes a receiver surrounding the passage, the receiver configured to be coupled to the outlet of the container.

4. The dispenser according to claim 3, wherein the receiver and the outlet are threaded.

5. The dispenser according to claim 3, wherein the container is open-ended.

6. The dispenser according to claim 1, further including a tether connecting the closure to the reservoir.

7. The dispenser according to claim 6, wherein the tether and the reservoir are formed as a single monolithic, one-piece structure.

8. The dispenser according to claim 6, wherein the tether and the closure are formed as a monolithic, one-piece structure.

9. The dispenser according to claim 1, wherein the closure comprises a plug in the passage.

10. The dispenser according to claim 1, wherein the carrier includes
    an opening configured to receive and retain the container, and
    an attachment to attach the carrier to the article worn by a person.

11. The dispenser according to claim 10, further comprising guides adjacent the opening of the carrier for positioning the container.

12. The dispenser according to claim 10, wherein the attachment is a hook extending from the carrier transverse to the opening.

13. The dispenser according to claim 10, further comprising a probe connected to the closure and a hole on the attachment for receipt of the probe when the closure is removed from the passage.

14. The dispenser of claim 13, further comprising a tether connecting the reservoir to the closure, and the probe is coupled to one of the closure or the tether.

15. The dispenser of claim 1, wherein the carrier includes a pair of spaced apart hooks having a channel therebetween.

16. The dispenser of claim 15, wherein the closure is configured to be retained in the channel when the closure is removed from the passage.

17. The dispenser according to claim 1, wherein the container has a longitudinal axis parallel to the bottom wall, and the container extends a greater length along the longitudinal axis than the reservoir.

18. The dispenser according to claim 1, wherein the carrier and the reservoir are integrally formed as a monolithic, one-piece structure.

19. A portable animal fluid dispenser comprising:

a reservoir having bottom and side walls;

a container detachably mounted to a first side wall of the reservoir;

the container having an outlet in fluid communication with a passage in the first side wall; and the dispenser having a longitudinal axis parallel to the bottom wall and the length of the container along the longitudinal axis being greater than the length of the reservoir along the longitudinal axis.

20. The dispenser according to claim 19, further comprising a closure configured to be removalby coupled to the passage.

21. The dispenser according to claim 20, further comprising a tether connecting the closure to the reservoir.

22. The dispenser according to claim 19, further comprising a receiver on the first side wall and facing radially outward from the reservoir, the receiver encompassing the passage and configured to be coupled to the container.

23. The dispenser, according to claim 22, wherein the receiver threadedly engages the outlet of the container.

24. The dispenser according to claim 19, further including a carrier having an opening configured to receive and retain the container, and an attachment to attach the carrier to an article worn by a person.

25. The dispenser according to claim 24, further comprising a probe connected to the closure, and a hole in the attachment configured to receive the probe when the closure is removed from the passage.

26. The dispenser according to claim 24, wherein the attachment includes at least one hook extending from the carrier transverse and to the opening.

27. The dispenser according to claim 26, further comprising at least a pair of hooks, and a channel formed between the hooks, and the closure is retained in the channel when removed from the passage.

28. The dispenser according to claim 19, wherein a carrier, the reservoir, a receiver, a tether, and a closure are integrally formed as a monolithic, one-piece structure.

* * * * *